(12) United States Patent
Huber et al.

(10) Patent No.: US 6,179,580 B1
(45) Date of Patent: Jan. 30, 2001

(54) MOTOR-PUMP ARRANGEMENT

(75) Inventors: Martin Huber, Oberkirch; Wilhelm Braun, Buehl, both of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/091,246

(22) PCT Filed: Aug. 23, 1997

(86) PCT No.: PCT/DE97/01837

§ 371 Date: Dec. 30, 1998

§ 102(e) Date: Dec. 30, 1998

(87) PCT Pub. No.: WO98/16986

PCT Pub. Date: Apr. 23, 1998

(30) Foreign Application Priority Data

Oct. 12, 1996 (DE) .............................................. 196 42 133

(51) Int. Cl.[7] .................................................. F04B 17/00
(52) U.S. Cl. .......................................... 417/360; 417/415
(58) Field of Search .................................... 417/273, 360, 417/415; 97/72

(56) References Cited

U.S. PATENT DOCUMENTS

| | | | | |
|---|---|---|---|---|
| 5,531,573 | * | 7/1996 | Nokuno | 417/360 |
| 5,564,909 | * | 10/1996 | Rischen et al. | 417/273 |
| 5,620,311 | * | 4/1997 | Wetzel | 417/360 |
| 5,839,349 | * | 11/1998 | Volz | 417/273 |
| 5,842,752 | * | 12/1998 | Sekiguchi et al. | 417/415 |

\* cited by examiner

*Primary Examiner*—Charles G. Freay
(74) *Attorney, Agent, or Firm*—Ronald E. Greigg; Edwin E. Greigg

(57) ABSTRACT

The invention relates to a motor-pump arrangement, having a cup-shaped motor housing for receiving an electric motor, and a pump housing that can be mounted on the motor housing. The pump housing can be mounted on the face end (R) of the motor housing opposite the cup bottom, and that a cap is provided, which can be pressed into the motor housing on the open face end and seals off this housing, the cap has a central bore for a drive shaft and at least one further opening, near the edge, for a through-plated hole.

19 Claims, 1 Drawing Sheet

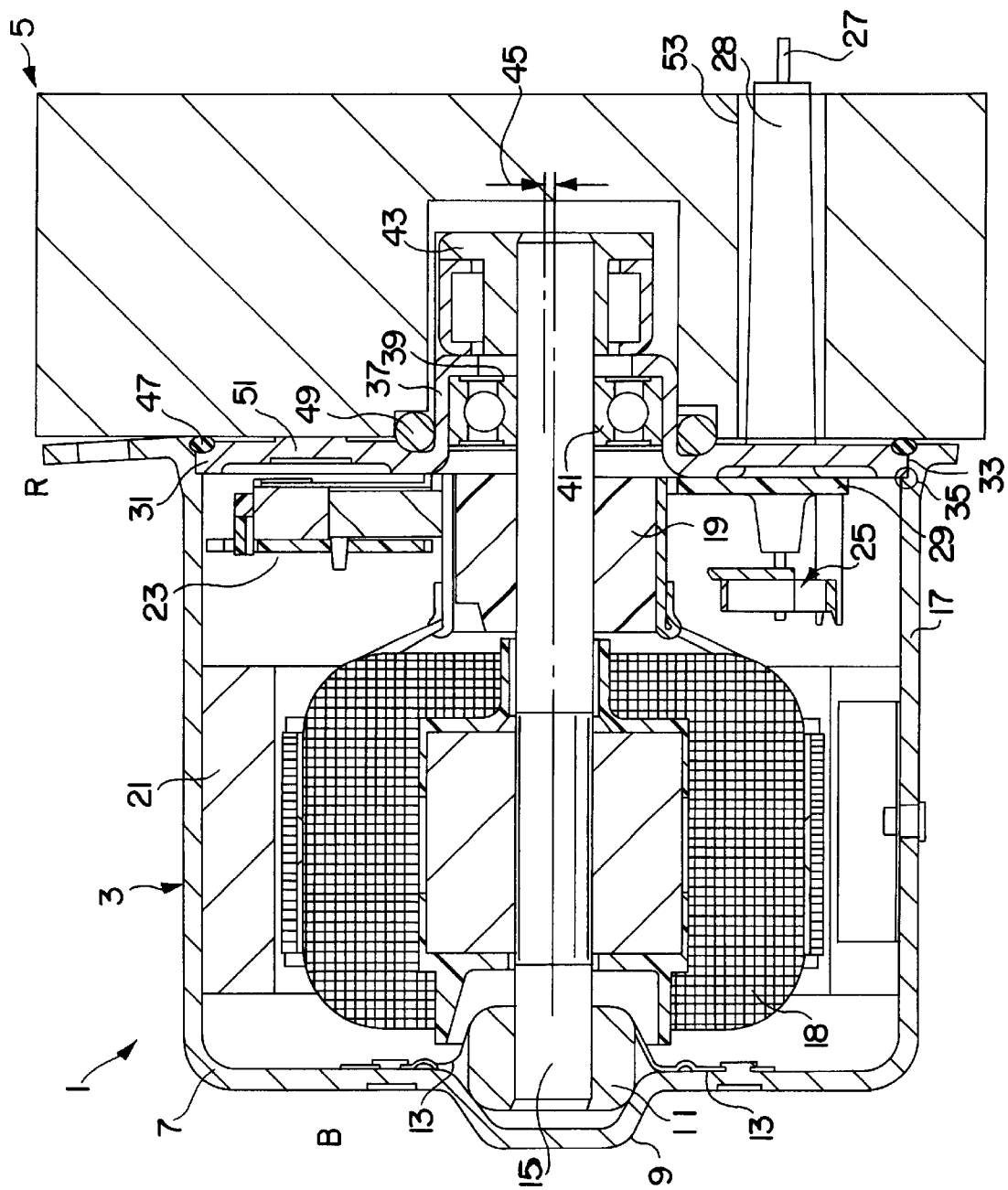

MOTOR-PUMP ARRANGEMENT

This application is a 371 of PCT/DE97/01837.

PRIOR ART

The invention relates to a motor-pump arrangement, having a cup-shaped motor housing for receiving an electric motor, and a pump housing that can be mounted on the motor housing.

From European Patent Disclosure EP 0 645 875 B1, a motor-pump unit is disclosed that has both a cup-shaped motor housing and a pump housing mounted on the motor housing. A bearing neck is embodied on the cup bottom of the motor housing and on one side receives at least one bearing, intended for supporting a drive shaft, and an eccentric element that serves to drive pump parts. In other words, the pump housing is seated on the cup bottom end face, and the bearing neck protrudes into the pump housing.

To prevent liquid, such as moisture, from penetrating to the interior of the motor housing, the pump housing rests sealingly on the cup bottom face of the motor housing. The open face end of the motor housing opposite the cup bottom is sealed off by a plastic cap placed on it, the edge of the cap abutting against a radially extending face of the pump housing. In this region as well, an encompassing seal is provided between the cap and the pump housing and is intended to prevent liquid and moisture from penetrating to the interior of the motor housing.

One disadvantage of this motor-pump unit is considered to be that the sealing of the motor housing is not optimal. Especially if the plastic cap is not manufactured to precise dimensions, it is possible that moisture may enter in the area of contact with the pump housing.

Moreover, because of the plastic cap used, the motor housing lacks sturdiness, and the absorption of radial forces in the region of the housing opposite the cup bottom is restricted.

ADVANTAGES OF THE INVENTION

The motor-pump arrangement has the advantage over the prior art that it has high strength and that the motor housing is well protected against the invasion of liquid.

Because a preferably metal cap is press-fitted into an open end of the cup-shaped motor housing, high radial forces can be absorbed on both face ends of the housing. Moreover, the cap can be press-fitted into the motor housing and thus secured in a single mounting step.

Preferably, the cap is embodied such that at least two radially spaced-apart annular seals can be mounted, preferably in the grooves provided in the cap face. This has the advantage of achieving very high protection against invading liquid in the region of the drive shaft.

The use of shaped sealing rings for the seals has proved to be especially advantageous. A further advantageous possibility is to produce the seal by injection-molding using a sealing material. A particular advantage is also considered to be that the cap is prefabricated with the two seals and can be mounted as a unit on the motor housing.

In another advantageous feature, the cap is embodied as a spring element. In this connection, spring element means that upon an imposition, for instance by a radial force, the cap yields resiliently and in the process the cap curves somewhat. On the one hand, this attains the advantage that the cap is seated securely and tightly in the housing with a certain prestressing. On the other, very good sealing can be attained between the cap and the adjoining pump housing, because the pump housing is pressed against the curvature of the cap and secured.

In another advantageous feature, a commutator of the electric motor and the current-carrying brushes are mounted on the cap side of the motor housing. This has the advantage that contacting the brushes by means of lines that are extended through the cap and the pump housing to a downstream control unit is simply unnecessary.

Because of the advantageous securing of the motor by means of straps in the motor housing, the advantage is attained that the demand for the shortest possible, direct courses for the forces to be absorbed is readily met.

BRIEF DESCRIPTION OF THE DRAWING

The invention will now be described in terms of an exemplary embodiment with reference to a sole drawing FIGURE, which is a schematic cross section through a motor-pump arrangement.

DESCRIPTION OF THE EXEMPLARY EMBODIMENT

In the drawing, a motor-pump arrangement 1 can be seen, which includes an electric motor 3 and a merely schematically shown pump unit 5. Such a structural unit is employed for instance as a high-pressure pump for hydraulic brake fluid, preferentially in ABS systems.

The electric motor 3 has a cup-shaped motor housing 7, on the bottom region B of which a bulge 9 is provided. This outward-oriented bulge 9 has a radial width that in at least one region is equivalent to the diameter of a bearing 11 to be received. Along with the supporting of the bearing in the bulge 9, additional straps 13 are provided, which assure both a radial and an axial fixation of the bearing.

A shaft 15 is supported in the bearing 11; it extends through the motor housing 7 substantially parallel to a cylinder wall 17 of the housing and protrudes by a certain extent past an edge R of the housing.

Windings of a rotor 18 are mounted in a known manner, fixed against relative rotation, on the drive shaft, as is a commutator 19 connected to the windings. The rotor is surrounded by magnets 21, which in turn are mounted on the cylinder wall 17 of the motor housing 3.

The delivery of current to the windings of the rotor is effected in a known manner via brushes 23, which cooperate with the commutator 19. Since rotors, commutators and brushes are conventional known components of an electric motor, their detailed description will be dispensed with here, and explicit reference is made to the prior art.

The delivery of current to the brushes 23 is effected via merely schematically shown contacts 25, which are connected to lines 27 extending to a control unit, not shown. The lines 27 themselves extend in a so-called dome 28, one end of which is located in the interior of the motor housing 7 and is secured on a holder 29 which holds the brushes 23 as well. It can be seen from the drawing that the dome 23 penetrates the bearing cap 31 in the region near the edge. An opening provided for this purpose in the bearing cap 31 can be well sealed, but the seal is not shown. The portion of the dome 28 protrudes past the edge R has an axial length at least equivalent to the axial width of the pump unit 5. It is moreover possible for the lines 27 to be disposed separately from one another, each in a respective dome 28. In that advantageous embodiment, one opening in the bearing cap 3 should be provided for each dome 28.

It is especially advantageous to embody the dome or domes 28 as a component of the holder 29, especially in the form of a plastic injection-molded part.

To close the motor housing 7, a bearing cap 31 is press-fitted onto the peripheral side R, so that a circumferential face 33 of the bearing cap 31 rests tightly on the inside face of the cylinder wall 17.

To prevent the bearing cap 31 from being press-fitted too far in the axial direction, a shoulder 35 acting as a stop is made in the inside face of the cylinder wall 17.

The cap 31 has a bearing neck 37, which is disposed concentrically to the edge of the cap 31 and extends in the axial direction. The end region of the bearing neck 37 is bent inward in flangelike fashion and includes a bore 39, which reaches through the drive shaft 15.

The drawing clearly shows that the bearing neck 37 receives a second bearing 41, in which the drive shaft 15 is supported. The inward-bent portion of the bearing neck 37 serves particularly to fix the bearing 41 axially.

An eccentric element 43 is mounted on the end region of the drive shaft 15, adjacent to the bearing neck 37, and serves to drive the pump parts, not shown, of the pump unit 5. The eccentricity is suggested in the drawing by arrows 45. The eccentric element drive is preferably embodied as a centered part with a needle bearing.

The sealing off of the interior of the motor housing from the entry of liquid is achieved not only by the already very tightly contacting circumferential face 33 but also by seals 47 provided on the outside of the cap. This invention includes a sealing ring, preferably a shaped sealing ring or a seal of injection-molded plastic material. Radially spaced apart from the sealing ring 47, a further sealing ring 49 is provided, which is located at the transition to the bearing neck. In addition to a sealing function against the entry of liquid from outside along the bearing neck 37 into the interior of the motor housing, the seal also serves to center the pump unit 5 mounted in place.

The drawing clearly shows that both sealing rings 47, 49 rest in suitably embodied recesses or grooves in the bearing cap 31.

Between the outer sealing ring 47 and the inner sealing ring 49, the bearing cap 31 has a region 51, which bulges outward toward the pump unit 5. This bulge 51 increases the elasticity of the bearing cap, so that it can be subjected to prestressing, comparable to a spring element, upon installation. If in the press-fitted state the bearing cap 31 has a slight curvature outward, then further sealing between the bearing cap 31 and the pump unit 5 is attained by means of the bulge 51, against which the pump unit 5 is pressed.

With the aid of this bearing cap 31, it is accordingly possible by means of one very simple mounting step to create very good sealing into the interior of the housing.

It should also be noted that the dome 28 passes all the way through a bore 53 provided in the pump unit 5, so that contacting with a downstream control unit through the pump unit 5 is made possible.

The foregoing relates to a preferred exemplary embodiment of the invention, it being understood that other variants and embodiments thereof are possible within the spirit and scope of the invention, the latter being defined by the appended claims.

What is claimed is:

1. A motor-pump arrangement, having a cup-shaped motor housing (7) for receiving an electric motor, and a pump housing (5) that is mounted on the motor housing, in which the pump housing (5) is mounted on an open face end (R) of the motor housing (7) opposite a cup bottom, and a cap (31) is provided, which is pressed into the motor housing (7) on the open face end and seals off the housing, the cap (31) has a central bore (39) for a drive shaft (15), a region which bulges outward and contacts the pump housing, and at least one further opening, near an edge of the cap, for at least one line (27).

2. A motor-pump arrangement according to claim 1, in which for each of the lines, one opening is provided.

3. A motor-pump arrangement according to claim 1, in which the cap (31) is embodied such that at least two radially spaced-apart annular seals (47, 49) are mounted on a side toward the pump housing (5).

4. A motor-pump arrangement according to claim 2, in which the cap (31) is embodied such that at least two radially spaced-apart annular seals (47, 49) are mounted on a side toward the pump housing (5).

5. A motor-pump arrangement according to claim 3, in which annular grooves are provided for receiving the seals (47, 49).

6. A motor-pump arrangement according to claim 4, in which annular grooves are provided for receiving the seals (47, 49).

7. A motor-pump arrangement according to claim 3, in which the seals (47, 49) are embodied as shaped sealing rings.

8. A motor-pump arrangement according to claim 4, in which the seals (47, 49) are embodied as shaped sealing rings.

9. A motor-pump arrangement according to claim 5, in which the seals (47, 49) are embodied as shaped sealing rings.

10. A motor-pump arrangement according to claim 3, in which the cap (31) is everted concentrically with the bore, and the eversion is embodied to receive a bearing (41).

11. A motor-pump arrangement according to claim 4, in which the cap (31) is everted concentrically with the bore, and the eversion is embodied to receive a bearing (41).

12. A motor-pump arrangement according to claim 5, in which the cap (31) is everted concentrically with the bore, and the eversion is embodied to receive a bearing (41).

13. A motor-pump arrangement according to claim 1, in which a commutator (19) is disposed on a power takeoff side of the motor housing (7).

14. A motor-pump arrangement according to claim 2, in which a commutator (19) is disposed on a power takeoff side of the motor housing (7).

15. A motor-pump arrangement according to claim 1, in which a bearing is mounted on the motor housing (7) by means of straps (13).

16. A motor-pump arrangement according to claim 2, in which a bearing is mounted on the motor housing (7) by means of straps (13).

17. A motor-pump arrangement according to claim 3, in which the seals (47,49) are embodied as injection-molded plastic material.

18. A motor-pump arrangement according to claim 4, in which the seals (47, 49) are embodied as injection-molded plastic material.

19. A motor-pump arrangement according to claim 5, in which the seals (47, 49) are embodied as injection-molded plastic material.

* * * * *